United States Patent
Ishizaki

(10) Patent No.: US 8,076,146 B2
(45) Date of Patent: Dec. 13, 2011

(54) METHODS FOR EVALUATING AND MANUFACTURING RUBBER AND METHOD FOR MANUFACTURING JOINT SEAL FOR INKJET PRINTER

(75) Inventor: Akemi Ishizaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1381 days.

(21) Appl. No.: 11/404,630

(22) Filed: Apr. 14, 2006

(65) Prior Publication Data

US 2006/0231965 A1 Oct. 19, 2006

(30) Foreign Application Priority Data

Apr. 19, 2005 (JP) ................................. 2005-121225

(51) Int. Cl.
*B29C 45/76* (2006.01)
(52) U.S. Cl. ....... 436/85; 264/40.1; 264/236; 264/328.2
(58) Field of Classification Search ................ 436/85; 264/40.1, 236, 328.2
See application file for complete search history.

(56) References Cited

U.S. PATENT DOCUMENTS

| | | | |
|---|---|---|---|
| 4,587,302 A * | 5/1986 | Berta | 525/237 |
| 6,959,984 B2 * | 11/2005 | Ogura et al. | 347/86 |

FOREIGN PATENT DOCUMENTS

| | | |
|---|---|---|
| JP | 8-122284 A | 5/1996 |
| JP | 2002-071595 A | 3/2003 |
| JP | 2004-099738 A | 4/2004 |

OTHER PUBLICATIONS

Lee. Elucidation of the structure of silane coupling agent films formed on metal surface. Master's Thesis for the Massachusetts Institute of Technology. pp. 25-34. (Feb. 1979).*
Desai et al. Fabrication of long-term hydrophilic elastomeric surfaces via plasma induced surface cross-linking of functional monomers. Surface and Coatings Technolgy. vol. 184. pp. 6-12. (Feb. 27, 2004).*
Hitsuda et al. Kinetics of the reactions of Cl(2P1/2) and Cl(2P3/2) atoms with C2H6, C2D6, CHF3, C2H5F, and CH3CF3 at 298 K. The Journal of Physical Chemistry A. vol. 105. pp. 5131-5136. (May 4, 2001).*

* cited by examiner

*Primary Examiner* — Robert J Hill, Jr.
*Assistant Examiner* — Dwan A Gerido

(57) ABSTRACT

A method for evaluating rubber is provided which can evaluate the degree of crosslinking of a crosslinked rubber product within a short period of time without performing any specific treatment. In the above method, the amount of energy shift of the peak (such as the peak of Cl2p3/2 of chlorinated butyl rubber) of a constituent element of the rubber is measured by photoelectron spectroscopy, and the degree of crosslinking of the rubber is evaluated from the amount of energy shift. In addition, a method for manufacturing a rubber product is also provided which includes the steps of measuring the amount of energy shift of the peak of a constituent element of the rubber product by a photoelectron spectrometer which is installed in a manufacturing line and then feeding back measurement result to adjust heat molding conditions so as to obtain a desired degree of crosslinking.

6 Claims, 5 Drawing Sheets

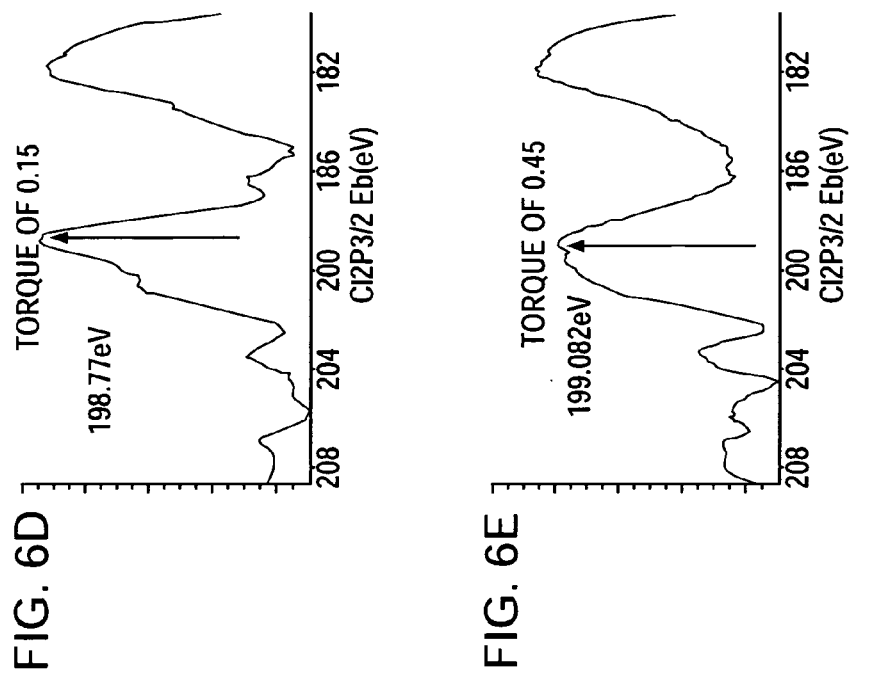
FIG. 6A
FIG. 6B
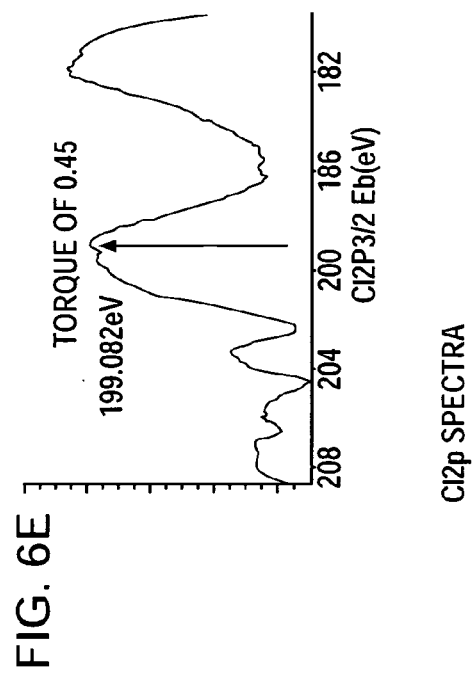
FIG. 6D
FIG. 6E
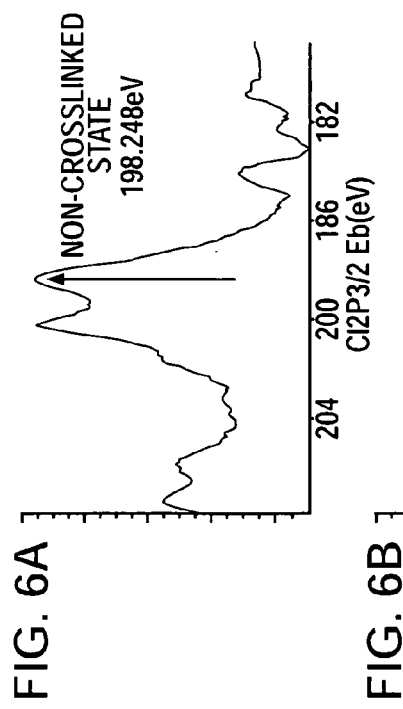
FIG. 6C

METHODS FOR EVALUATING AND MANUFACTURING RUBBER AND METHOD FOR MANUFACTURING JOINT SEAL FOR INKJET PRINTER

BACKGROUND OF THE INVENTION

1. Field of the Invention

The present invention relates to methods for evaluating and manufacturing rubber and a method for manufacturing a joint seal used for an inkjet printer (hereinafter referred to as "inkjet-printer joint seal").

2. Description of the Related Art

The degree of crosslinking of rubber is an important factor in determining rubber properties and is essential for designing and inspecting a rubber product. In general, measuring the degree of rubber crosslinking is often performed by a swelling test. However, since evaluating the degree of crosslinking by the swelling test is a method in which the swelling rate is measured by immersing a rubber sample in a solvent, several days are required for this evaluation, and hence the degree of crosslinking of rubber cannot be easily evaluated. In addition, when the amount of rubber which is used for the evaluation is small, the error of measurement is increased, and as a result, it becomes difficult to accurately obtain the degree of crosslinking.

In addition, as another method for measuring the degree of crosslinking of rubber, there may be mentioned a method in which the degree of crosslinking is obtained from a torque value of rubber which is measured using a curastometer. In this method, a non-vulcanized rubber is used as a sample, a vulcanizing curve of this non-vulcanized rubber is formed in which the horizontal axis indicates the time and the vertical axis indicates the torque, and the degree of crosslinking of rubber is evaluated using this vulcanizing curve. However, since being required to have a predetermined size or more and a specific shape, the test piece used for this curastometer evaluation is different from an actual product in size and in shape. Hence, it is difficult to determine accurate crosslinking conditions for an actual product from the measurement using a curastometer. In addition, since the above method cannot be applied to a crosslinked rubber, the degree of crosslinking of an actual rubber product cannot be evaluated.

As still another method for evaluating the degree of crosslinking of rubber, there may be mentioned a method in which the degree of crosslinking of rubber is evaluated by measuring a relaxation time by solid NMR (nuclear magnetic resonance) (see Japanese Patent Laid-Open Nos. 8-122284 and 2002-71595). However, by the measurement method using solid NMR, measurement is performed at a high speed, such as several tens of thousands rpm. Hence, in order to prevent a spinner (rotary tube) which contains a sample from being eccentrically rotated, it is necessary to uniformly fill the sample in the spinner. Accordingly, since it is difficult to measure a rubber product itself, pretreatment for the measurement is necessarily performed, such that a rubber sample is cut into a shape so as to be inconformity with the inside shape of the spinner or is ground into a powder. Furthermore, information thus obtained is average information of an entire sample, and when the degree of crosslinking of rubber varies from part to part, the deviation thereof cannot be evaluated.

SUMMARY OF THE INVENTION

The present invention is directed to a method for evaluating the degree of crosslinking of rubber within a short period of time even when the rubber is a crosslinked rubber product, and a method for manufacturing rubber having a desired degree of crosslinking by using the above evaluation method. In addition, the present invention is also directed to a method for manufacturing an inkjet-printer joint seal by using the above evaluation method.

Through intensive research implemented by the inventor of the present invention on a method for evaluating the degree of crosslinking of a crosslinked rubber, a parameter which is very effective for evaluation of the degree of crosslinking of rubber was discovered. In particular, it was found that an energy value of a specific peak measured by photoelectron spectroscopy is shifted approximately linearly with the change in degree of crosslinking of rubber. When the degree of crosslinking of rubber is indirectly evaluated by using this phenomenon, the degree of crosslinking of a rubber product itself can be evaluated within a short period of time without performing any particular pretreatment, and hence superior quality control can be performed.

That is, according to a first aspect of the present invention, there is provided a method for evaluating rubber, comprising the steps of measuring an amount of energy shift of a peak of a constituent element of the rubber by photoelectron spectroscopy, and evaluating a degree of crosslinking of the rubber from the amount of energy shift.

In addition, according to a second aspect of the present invention, there is provided a method for evaluating rubber, comprising the steps of measuring an amount of energy shift of a peak of a constituent element of chlorinated butyl rubber by photoelectron spectroscopy, and evaluating a degree of crosslinking of the chlorinated butyl rubber from the amount of energy shift.

According to a third aspect of the present invention, there is provided a method for manufacturing rubber, comprising the steps of molding the rubber by heat crosslinking, measuring an amount of energy shift of a peak of a constituent element of the molded rubber, calculating a degree of crosslinking of the molded rubber from the amount of energy shift, and feeding back the degree of crosslinking calculated in the calculation step to the molding step.

Furthermore, according to a fourth aspect of the present invention, there is provided a method for manufacturing an inkjet-printer joint seal, in which chlorinated butyl rubber is simultaneously molded and crosslinked to form an inkjet-printer joint seal. The method described above comprises the steps of molding chlorinated butyl rubber by heat crosslinking to form the joint seal; measuring an amount of energy shift of a peak of $Cl(^2P_{3/2})$ of the molded chlorinated butyl rubber by a photoelectron spectrometer which is installed in a manufacturing line, feeding back the amount of energy shift measured in the measuring step to the molding step, and adjusting heat molding conditions so that the amount of energy shift of the peak of $Cl(^2P_{3/2})$ is within the range of 0.6 eV±0.3 eV. Here, the amount of energy shift indicates the amount on the basis of the peak of $Cl(^2P_{3/2})$ of the joint seal formed from non-crosslinked chlorinated butyl rubber.

According to the present invention, the degree of crosslinking of rubber can be evaluated using a rubber product itself without performing any particular treatment. In addition, since the evaluation method is performed by photoelectron spectroscopy, an area of a sample used in one measurement is small, such as from several tens of micrometers to several millimeters, so that the degree of crosslinking of a part of a product having a desired shape can be evaluated or the distribution and variation in degree of crosslinking of one product can also be evaluated.

When this evaluation method of the present invention is applied to a manufacturing process, that is, in particular, when a photoelectron spectrometer is installed in a manufacturing line, the degree of crosslinking of rubber can be easily and rapidly evaluated in the manufacturing process. Hence, a rubber having a predetermined degree of crosslinking can be easily and accurately manufactured.

In particular, the present invention can be very effectively applied to manufacturing of an inkjet-printer joint seal or the like using chlorinated butyl rubber.

Further features of the present invention will become apparent from the following description of exemplary embodiments with reference to the attached drawings.

BRIEF DESCRIPTION OF THE DRAWINGS

FIGS. 6A to 6E are views showing spectra of samples (A) to (E) of an example obtained by XPS measurement.

DESCRIPTION OF THE EMBODIMENTS

In the present invention, the degree of crosslinking of rubber is evaluated by the amount of energy shift of the peak of a constituent element forming the rubber through measurement using photoelectron spectroscopy (hereinafter referred to as "XPS"). The XPS measurement is an analytical method in which x-rays are irradiated to a sample in an ultrahigh vacuum atmosphere, followed by measurement of energy of photoelectrons emitted thereby using an energy analyzer. As excited x-rays, for example, a relatively low energy such as $K\alpha$ of Al or Mg may be used. The energy analyzer is a device measuring kinetic energy of an electron using an electric field, and as the energy analyzer, a concentric hemispherical analyzer (CHA), a cylindrical mirror analyzer (CMA), and the like may be mentioned by way of example.

An electron forming an atom is bound to the nucleus by a predetermined force, and kinetic energy of a photoelectron emitted by irradiation of x-rays is a value obtained by subtracting the bound energy from the energy of excited light. Incidentally, the bound energy has principally a predetermined value which is determined by the type of atom and the orbit of an electron. However, when the atom forms a compound or the like, the bound energy described above changes from that obtained when the atom is in a free state, and this change is called the chemical shift.

The present invention was made based on new knowledge in which the amount of energy shift of the peak of a constituent element of rubber obtained by XPS measurement is changed approximately linearly, that is, in a linear function manner, with the change in degree of crosslinking.

Figure 1:
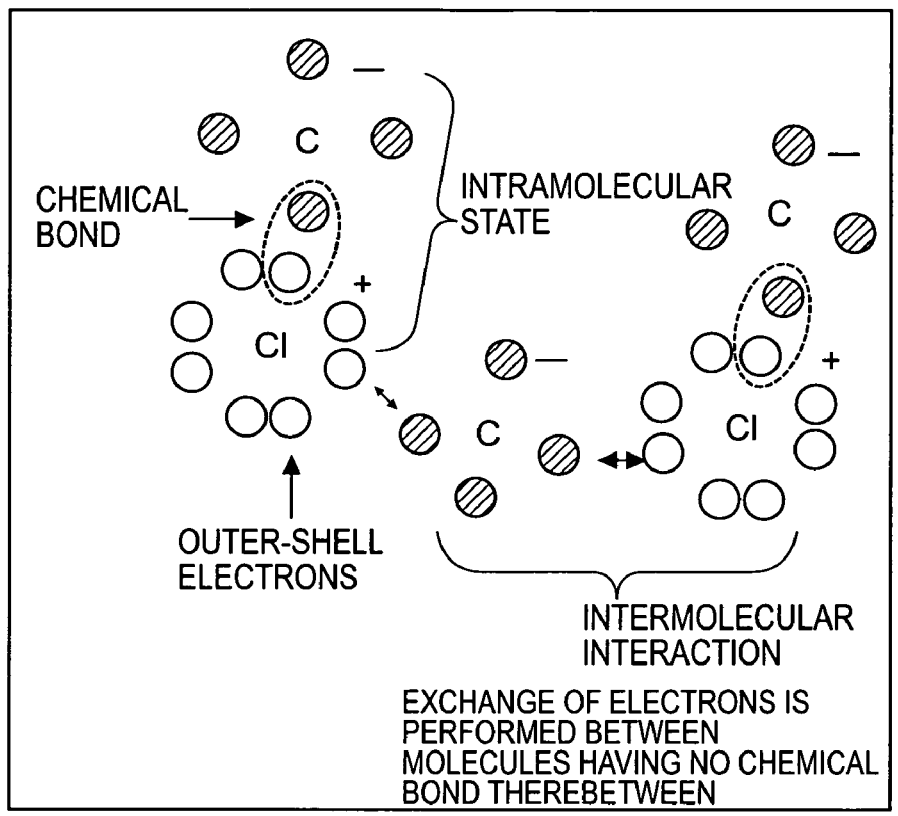
FIG. 1 is a schematic view showing the state of molecules of a crosslinked chlorinated butyl rubber.

According to the inventor's knowledge, the degree of crosslinking of chlorinated butyl rubber has a linear functional relationship with the amount of energy shift of $Cl(^2P_{3/2})$ of the above rubber obtained by XPS measurement. The reason the value of $Cl(^2P_{3/2})$ is changed in accordance with the change in degree of crosslinking of this chlorinated butyl rubber may be construed as described below. As shown in FIG. 1, in the chlorinated butyl rubber, a Cl atom forms a chemical bond (covalent bond) with a C atom present in the vicinity thereof, and in addition, between a Cl atom and a C atom which is not chemically bonded thereto and which is present in the vicinity thereof, a weak and non-chemical bond is formed by intermolecular interaction. In addition, since sharing an electron with a C atom, the Cl atom has a slightly positive charge, and hence electrons thereof are more tightly bound due to this positive charge. Accordingly, it is believed that when XPS measurement is performed, Eb (bond energy) is shifted to a higher side, and in addition, that when the number of neighboring molecules is increased, the shift in energy level of Cl is increased. Since molecules generally form a network structure in rubber, as the degree of crosslinking is higher, the Cl atom tends to receive influence (intermolecular interaction) of many neighboring molecules. Hence, it is believed that as the degree of crosslinking is increased, the energy shift of $Cl(^2P_{3/2})$ is increased.

The present invention was made based on the knowledge described above, and by measuring the amount of energy shift of a Cl atom using XPS measurement, the degree of crosslinking of rubber is evaluated based on the measurement result thereof.

Unlike the NMR method and the torque measurement (measurement of degree of crosslinking) by a curastometer, the evaluation of the degree of crosslinking by XPS measurement is significantly advantageous since a rubber product itself, which is molded and crosslinked, can be evaluated. In addition, since the measurement can be performed in a small area, such as from several tens of micrometers to several millimeters, the distribution of the degree of crosslinking in a molded product can also be evaluated.

For example, when a joint seal is formed by injection molding using chlorinated butyl rubber, the $Cl(^2P_{3/2})$ peak obtained by XPS measurement is shifted to a higher energy side as the degree of crosslinking of the rubber is increased. In particular, the relationship shown in FIG. 2, which will be described below in detail, is obtained. Hence, when the degree of crosslinking is evaluated by measuring the amount of energy shift of the $Cl(^2P_{3/2})$ peak, and when this measurement result is fed back to injection molding conditions, a joint seal can be provided in which the variation in degree of crosslinking is minimized.

Figure 7:
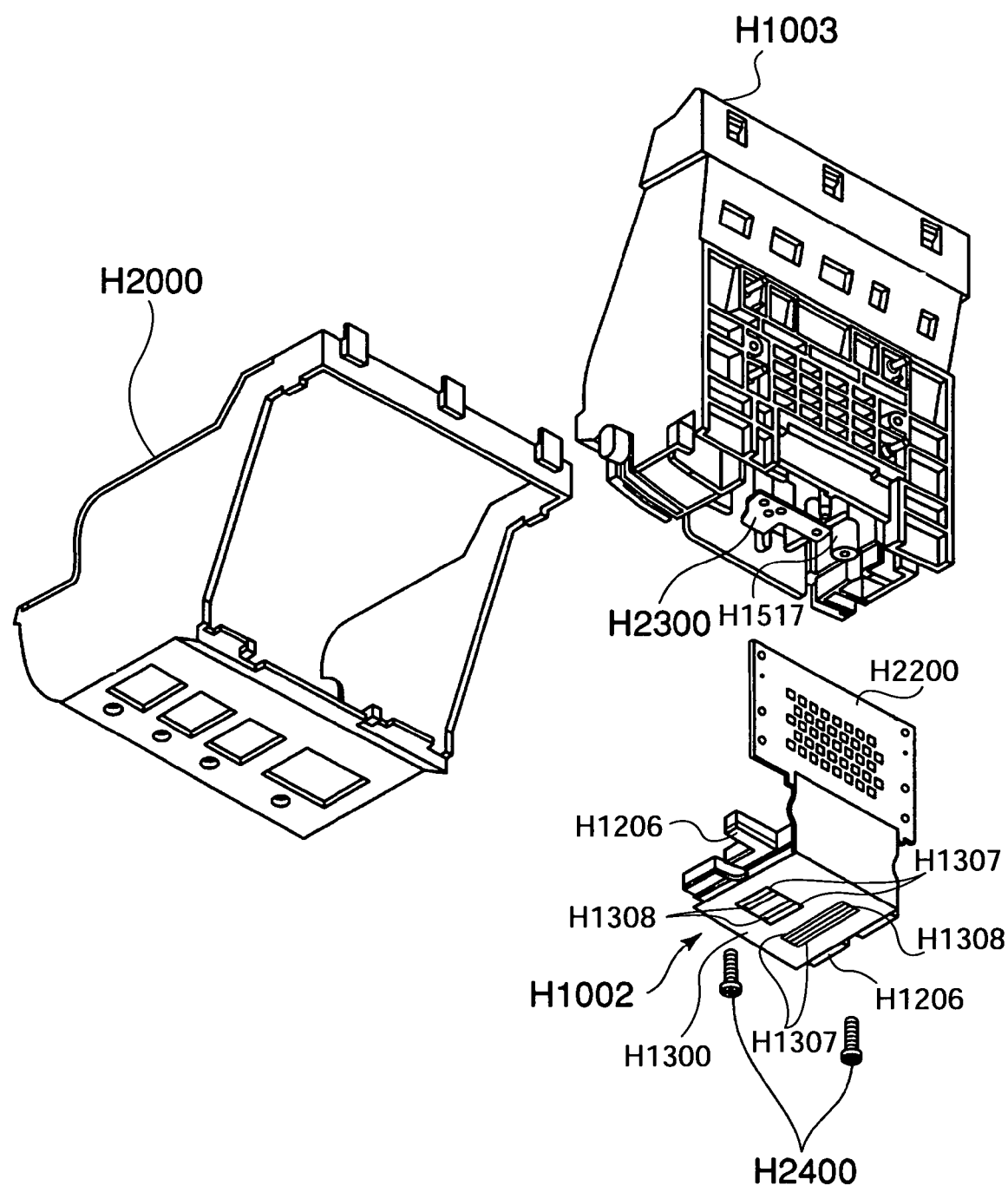
FIG. 7 is an exploded perspective view of a recording head portion of an inkjet recording head cartridge to which a joint rubber of an example is applied.

An inkjet-printer joint seal may be applied, for example, to an embodiment shown in FIG. 7. As shown in FIG. 7, a recording head portion is formed of a recording element unit H1002, an ink supply unit H1003, and a tank holder H2000. In addition, the ink supply unit H1003 is connected to the recording element unit H1002 with a joint seal member H2300 provided therebetween. Accordingly, ink in an ink tank (not shown) can be supplied to the recording element unit H1002.

In addition, the joint seal of the present invention is not limited to the above example. In particular, the joint seal of the present invention may be applied to a rubber member for sealing a hole of an ink chamber of an ink cartridge. When an ink cartridge is mounted, a joint needle penetrates a joint seal and is inserted inside, and the joint seal seals the periphery of a part of the joint needle, which is in contact with the joint seal, by its elastic shrinkage, so that ink is allowed to flow only inside the joint needle. Furthermore, the joint seal of the present invention may also be applied to a joint seal disposed around an ink supply port of a tank holder in which a detachable ink tank is mounted.

Figure 3:
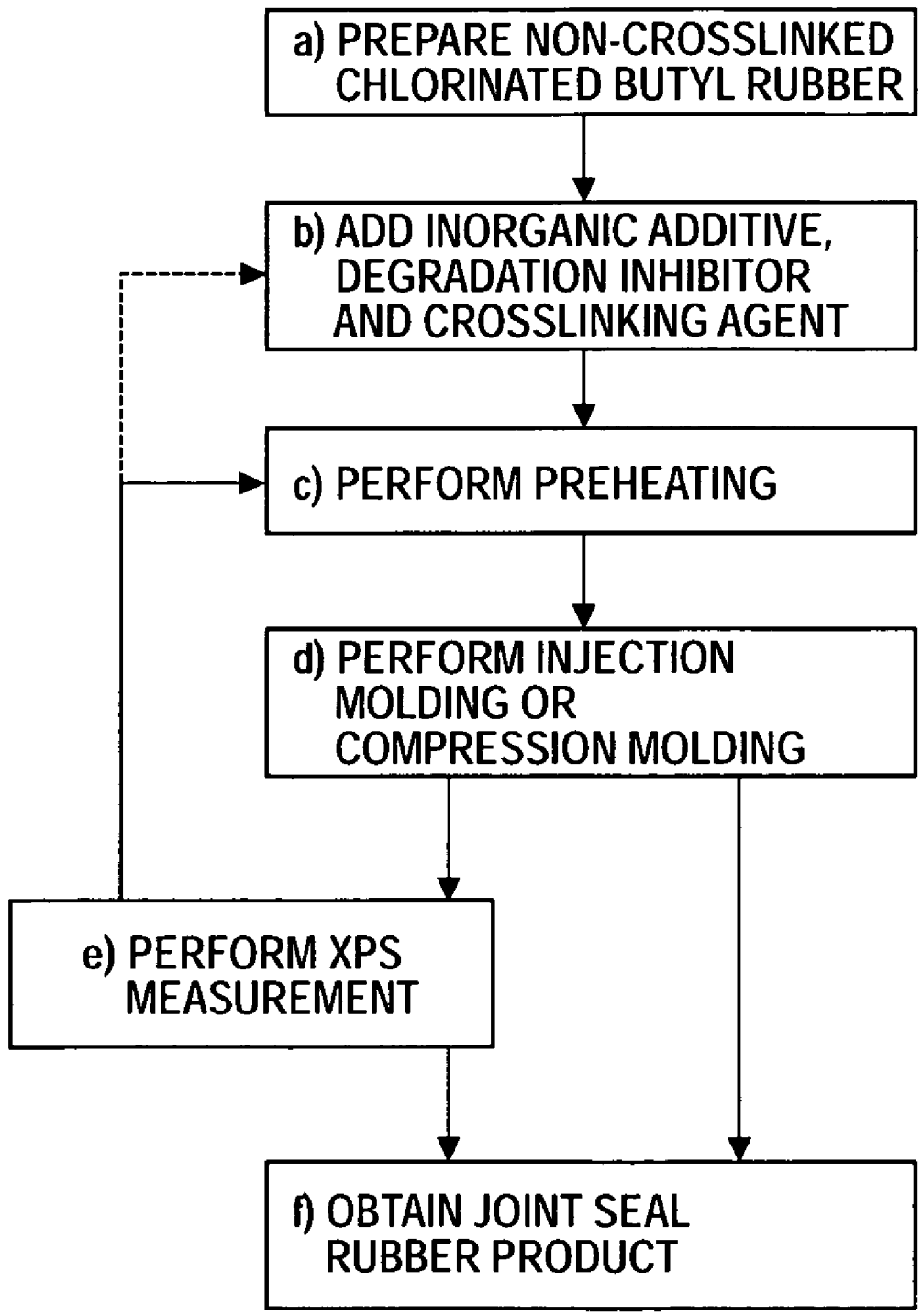
FIG. 3 is a flowchart of a method for manufacturing a rubber product.

FIG. 3 is a flowchart of a rubber manufacturing process (joint seal manufacturing process). In this case, the above XPS device is installed in the manufacturing process. As shown by this flowchart, for example, the process has the step of (a) preparing a non-crosslinked chlorinated butyl rubber used as a raw material, (b) adding an inorganic additive, a degradation inhibitor, a crosslinking agent, and the like, (c) performing preheating, (d) performing injection molding or compression molding, (e) performing XPS measurement, and (f) obtaining a joint seal rubber product. In this process, for example, the amount of energy shift of $Cl(^2P_{3/2})$ of a molded rubber processed in step (d) is measured by the XPS measurement, so that the degree of crosslinking is evaluated. When this measurement value of the amount of energy shift is not within a predetermined range designed beforehand, the molding conditions or synthetic conditions are adjusted so as to obtain a desirable degree of crosslinking. In particular, when the measurement is performed, the amount of energy shift of the $Cl(^2P_{3/2})$ peak of the chlorinated butyl rubber is adjusted within the range of 0.6 eV±0.3 eV. The reason for this is that when the amount of energy shift is out of the above range, sealing properties for preventing ink leakage are degraded as described later. When the measured value is in the above range, the joint seals are then assembled in products. The successive steps described above may be performed, for example, as a sampling inspection with regular intervals.

EXAMPLES

Hereinafter, the present invention will be described in detail with reference to examples.

[Measurement of Torque by Curastometer]

First, in order to clearly understand the relationship of the degree of crosslinking of rubber for evaluation with a heating time and a heating temperature, by using a non-crosslinked chlorinated butyl rubber composition, torque measurement (measurement of degree of crosslinking) was performed by a curastometer in the following manner.

Figure 4:
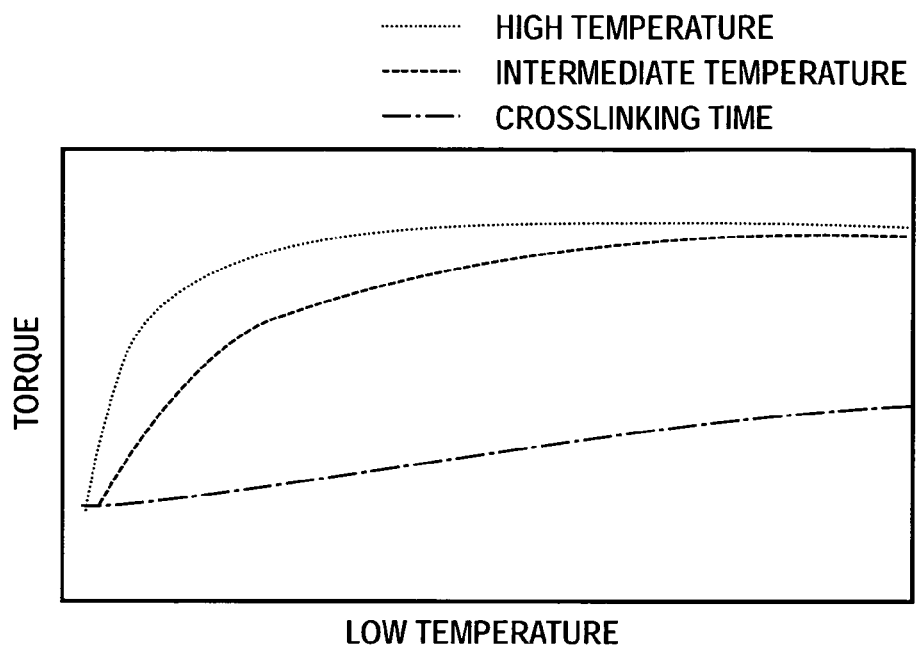
FIG. 4 is a graph showing the relationship between the crosslinking time and the degree of crosslinking.
Figure 5:
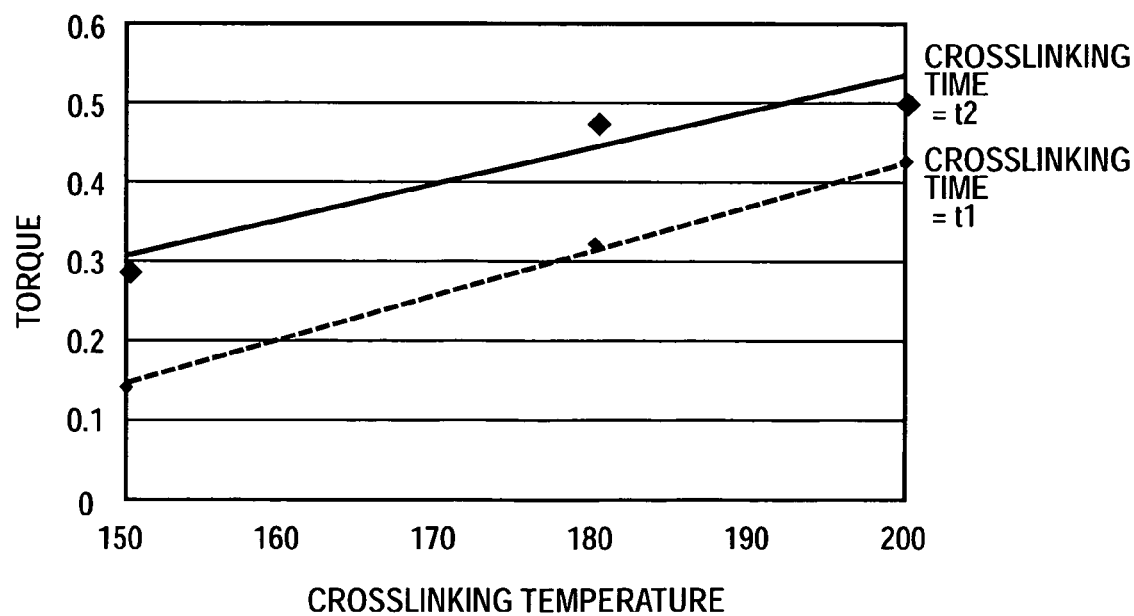
FIG. 5 is a graph showing the relationship between the crosslinking temperature and the degree of crosslinking.

An inorganic additive such as a vulcanization accelerator and an organic degradation inhibitor were added to chlorinated butyl rubber, followed by kneading, so that a non-vulcanized (non-crosslinked) chlorinated butyl rubber composition (A) was prepared. Next, while a constant temperature was maintained, the change in torque with time was measured. The results are shown in FIG. 4. It is understood that when the temperature is low, a crosslinking rate is low, and that when the temperature is high, crosslinking rapidly occurs and is completed within a short period of time. FIG. 5 is a graph prepared based on the results shown in FIG. 4, and in FIG. 5, the horizontal axis represents the crosslinking temperature and the vertical axis represents the torque. From this figure, it is understood that the degree of crosslinking of the chlorinated butyl rubber can be controlled by changing the heating temperature.

Next, by using a non-vulcanized chlorinated butyl rubber composition (A) similar to that described above, a low crosslinked joint seal (D) and a high crosslinked joint seal (E) were formed by compression molding. The torque (degree of crosslinking) of this low crosslinked joint seal (D) was 0.15 and the torque (degree of crosslinking) of this high crosslinked joint seal (E) was 0.45.

[XPS Measurement and Evaluation of Degree of Crosslinking]

Next, for each of the non-vulcanized chlorinated butyl rubber composition (A), the low crosslinked joint seal (D), and the high crosslinked joint seal (E), an energy value of $Cl(^2P_{3/2})$ of the chlorinated butyl rubber was measured by an XPS method.

The measurement conditions are as follows.
Measurement apparatus: JPS-9200 (JEOL)
Measurement conditions: x-rays: MgKα, Output: 200 W (10 kV×20 mA)
Measurement diameter: 1 mm diameter
Energy resolution: Analyzer transmission energy 10 eV (0.9 eV at the Ag3d5/2 peak)
Measured elements: F1s, O1s, Cl2p, and Si2p As the results of this XPS measurement, the energy value of $Cl(^2P_{3/2})$ of the non-vulcanized chlorinated butyl rubber (A) was 198.248 eV, the energy value of $Cl(^2P_{3/2})$ of the low crosslinked joint seal (D) was 198.77 eV, and the energy value of $Cl(^2P_{3/2})$ of the high crosslinked joint seal (E) was 199.082 eV.

That is, the amount of energy shift of $Cl(^2P_{3/2})$ of the low crosslinked joint seal (D) having a torque of 0.15 was 0.522, and the amount of energy shift of $Cl(^2P_{3/2})$ of the high crosslinked joint seal (E) having a torque of 0.45 was 0.834.

Figure 2:
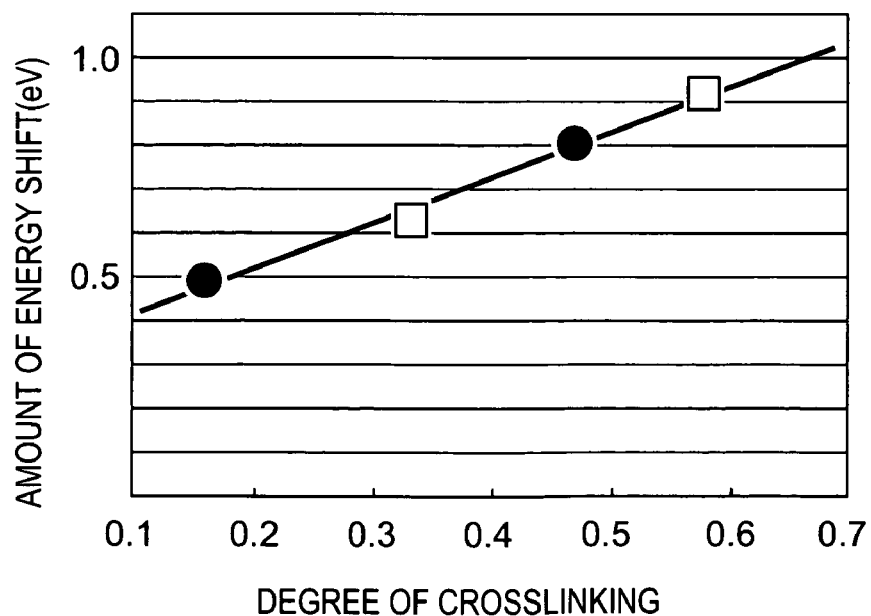
FIG. 2 is a graph showing the calibration curve obtained from the degree of crosslinking of rubber and the amount of energy shift, which are measured in an example.

A calibration curve shown in FIG. 2 was obtained based on the data described above, in which the horizontal axis represents the degree of crosslinking obtained from the above torque measurement and the vertical axis represents the amount of energy shift obtained from the above XPS measurement. In the figure, the data of (D) and (E) are shown by "●". As shown in this figure, the degree of crosslinking is a linear function of the amount of energy shift, and hence the relationship therebetween is represented by a straight line.

Next, by using a non-vulcanized chlorinated butyl rubber composition (A) similar to that described above, a joint seal (B) and a joint seal (C) were formed by injection molding. The energy values of Cl2p3/2 of the chlorinated butyl rubbers of the joint seals (B) and (C) were measured by an XPS method in the same manner as described above.

According to the results obtained by the XPS measurement, the energy value of $Cl(^2P_{3/2})$ of the joint seal (B) was 198.864 eV, and that of the joint seal (C) was 199.168 eV.

That is, the amount of energy shift of $Cl(^2P_{3/2})$ of the joint seal (B) was 0.616, and that of $Cl(^2P_{3/2})$ of the joint seal (C) was 0.920.

When the degree of crosslinking corresponding to the above value is obtained from the calibration curve shown in FIG. 2, the degree of crosslinking of the joint seal (B) is 0.32, and that of the joint seal (C) is 0.57. The data of (B) and (C) are shown by "□".

In addition, FIGS. 6A to 6E show spectra obtained by the XPS measurement of the above (A) to (E), respectively. In the $Cl(^2P_{3/2})$ spectrum, two peaks of 2p3/2 and 2p1/2 are observed, and it is understood that of these two peaks, the position of the 2p3/2 peak is gradually shifted to a high bond energy side as the degree of crosslinking is increased.

The degrees of crosslinking of the joint seals (B) and (C) which are generally estimated from the crosslinking molding conditions and the measurement results by the curastometer are both 0.32. However, even if the same molding condition is used, when molding is performed on different days or at different times, or when lots of rubber materials are different, the same degree of crosslinking may not be always obtained. In addition, it is believed that the reasons the degree of crosslinking of a molded chlorinated butyl rubber may not coincide with a predetermined value and may vary in some cases are caused, for example, by different molding methods, variations in temperature distribution, slight deviation in temperature measurement, and variations in rubber material components.

When the degree of crosslinking is increased, the inherent properties of rubber are degraded by curing, and as a result, a stable function as a rubber product may not be obtained in some cases. From the point described above, in this example, as an inkjet-printer joint seal, the joint seal (B) is a good product, and the joint seal (C) is a defective product.

As has thus been described, in order to maintain a desired degree of crosslinking of molded rubber and to perform sufficient quality control, it is important that after the degree of crosslinking of an actually molded rubber product is measured, the result thereof be fed back to the molding conditions. Hence, as is the case of this example, it is very effective to evaluate the degree of crosslinking of an actually molded joint seal by XPS measurement. In particular, for example, the degrees of crosslinking of products in process are sequentially evaluated by a sampling inspection in a manufacturing process, and when a defective product having a high degree of crosslinking is formed as is the joint seal (C), the information is fed back, so that heat molding conditions such as a heating temperature and/or a heating time are changed. As a result, when the energy shift value of $Cl(^2P_{3/2})$ is simply adjusted within the range of 0.6 eV±0.3 eV, easy and superior product control can be performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-121225 filed Apr. 19, 2005, which is hereby incorporated by reference herein in its entirety.

What is claimed is:

1. A method for evaluating chlorinated butyl rubber, comprising:
    measuring an amount of energy shift of a peak of $Cl(^2P_{3/2})$ by photoelectron spectroscopy, the $Cl(^2P_{3/2})$ being a constituent element of the chlorinated butyl rubber;
    determining a relationship between the amount of energy shift of the peak and a degree of crosslinking of the rubber as a linear functional relationship; and
    evaluating the degree of crosslinking of the chlorinated butyl rubber based on the linear functional relationship with the amount of energy shift.

2. A method for evaluating rubber, comprising:
    measuring an amount of energy shift of a peak of a constituent element of chlorinated butyl rubber by photoelectron spectroscopy;
    determining a relationship between the amount of energy shift of the peak and a degree of crosslinking of the rubber as a linear functional relationship; and
    evaluating the degree of crosslinking of the chlorinated butyl rubber based on the linear functional relationship with the amount of energy shift.

3. The method according to claim 2, wherein the measuring the amount of energy shift of the peak includes measuring an amount of energy shift of a peak of $Cl(^2P_{3/2})$ of the chlorinated butyl rubber.

4. A method for manufacturing rubber, comprising:
    molding the rubber by heat crosslinking;
    measuring an amount of energy shift of a peak of a constituent element of the molded rubber;
    determining a relationship between the amount of energy shift of the peak and a degree of crosslinking of the rubber as a linear functional relationship;
    calculating the degree of crosslinking of the molded rubber based on the linear functional relationship with the amount of energy shift; and
    feeding back the calculated degree of crosslinking to the molding step.

5. The method according to claim 4, wherein the measuring the amount of energy shift of the peak includes measuring an amount of energy shift of a peak of $Cl(^2P_{3/2})$ of the chlorinated butyl rubber.

6. A method for manufacturing an inkjet-printer joint seal, comprising:
    molding chlorinated butyl rubber by heat crosslinking to form the joint seal;
    measuring an amount of energy shift of a peak of $Cl(^2P_{3/2})$ of the molded chlorinated butyl rubber by a photoelectron spectrometer;
    determining a relationship between the amount of energy shift of the peak and a degree of crosslinking of the rubber as a linear functional relationship;
    evaluating the degree of crosslinking of the chlorinated butyl rubber based on a linear functional relationship with the amount of energy shift;
    feeding back the evaluated degree of crosslinking to the molding step; and
    adjusting heat molding conditions so that the amount of energy shift of the peak of $Cl(^2P_{3/2})$ is within a range of 0.6 eV±0.3 eV.

* * * * *